(12) United States Patent
Jahnle et al.

(10) Patent No.: US 12,589,551 B2
(45) Date of Patent: Mar. 31, 2026

(54) PRINTING DEVICE FOR A 3D PRINTER

(71) Applicant: Robert Bosch GmbH, Stuttgart (DE)

(72) Inventors: Hendrik Jahnle, Leutenbach (DE);
Hans Bargen, Korntal-Muenchingen
(DE); Victor Roman, Stuttgart (DE)

(73) Assignee: Robert Bosch GmbH, Stuttgart (DE)

( * ) Notice: Subject to any disclaimer, the term of this
patent is extended or adjusted under 35
U.S.C. 154(b) by 225 days.

(21) Appl. No.: 17/782,685

(22) PCT Filed: Nov. 13, 2020

(86) PCT No.: PCT/EP2020/082006
§ 371 (c)(1),
(2) Date: Jun. 6, 2022

(87) PCT Pub. No.: WO2021/110383
PCT Pub. Date: Jun. 10, 2021

(65) Prior Publication Data
US 2023/0011265 A1 Jan. 12, 2023

(30) Foreign Application Priority Data

Dec. 6, 2019 (DE) ..................... 10 2019 219 083.9

(51) Int. Cl.
*B29C 64/343* (2017.01)
*B29C 64/209* (2017.01)
(Continued)

(52) U.S. Cl.
CPC .......... *B29C 64/343* (2017.08); *B29C 64/209*
(2017.08); *B29C 64/227* (2017.08); *B33Y*
*30/00* (2014.12); *B33Y 40/00* (2014.12)

(58) Field of Classification Search
CPC ... B29C 64/343; B29C 64/209; B29C 64/227;
B29C 64/321; B33Y 30/00
See application file for complete search history.

(56) References Cited

U.S. PATENT DOCUMENTS

| 2015/0307385 | A1* | 10/2015 | Klein | ..................... | C03B 19/00 |
| | | | | | 65/29.11 |
| 2018/0009164 | A1 | 1/2018 | Honda | | |
| 2018/0250845 | A1* | 9/2018 | Gaignon | ................. | B28B 1/001 |

FOREIGN PATENT DOCUMENTS

| CN | 110239060 A | 9/2019 | |
| DE | 102017205673 A1 * | 10/2018 | ........... B29C 45/535 |

(Continued)

OTHER PUBLICATIONS

Translation of International Search Report for Application No.
PCT/EP2020/082006 dated Feb. 22, 2021 (2 pages).

*Primary Examiner* — Galen H Hauth
*Assistant Examiner* — Mohamed K Ahmed Ali
(74) *Attorney, Agent, or Firm* — Michael Best &
Friedrich LLP

(57) ABSTRACT
The invention relates to a printing device (10) for a 3D
printer. The printing device comprises a metering unit (18)
for melting and plasticizing a material (38) to be printed and
a delivery unit (14) for printing the material (38) provided
via the metering unit (18). The metering unit (18) and the
delivery unit (14) are arranged separately from each other
and can be connected to each other, wherein the delivery unit
(14) can be transported to the metering unit (18) in order to
receive material (38) and, in order to connect the delivery
unit (14) to the metering unit (18), a nozzle (74) of the
delivery unit (14) and a coupling point (62) of the metering
unit (18) come into contact with each other.

12 Claims, 2 Drawing Sheets

(51) Int. Cl.
　　　*B29C 64/227*　　　　(2017.01)
　　　*B33Y 30/00*　　　　(2015.01)
　　　*B33Y 40/00*　　　　(2020.01)

(56) References Cited

FOREIGN PATENT DOCUMENTS

| KR | 20150022867 A | 3/2015 | |
|----|---------------|--------|--|
| KR | 20190017372 A | 2/2019 | |
| WO | WO-2017040975 A1 * | 3/2017 | ......... A61L 27/3804 |
| WO | 2018086792 A1 | 5/2018 | |

* cited by examiner

PRINTING DEVICE FOR A 3D PRINTER

BRIEF DESCRIPTION OF THE DRAWINGS

The present invention relates to a printing device for a 3D printer and to a method for operating such a printing device.

A 3D printer for a material of variable viscosity receives a solid phase of this material as a starting material, generates a liquid phase therefrom, and selectively brings this liquid phase to locations which belong to the object to be created. Such a 3D printer comprises a print head in which the starting material is prepared so that it is print-ready. The material is here conveyed onward via ducts in the print head.

Figure 1:
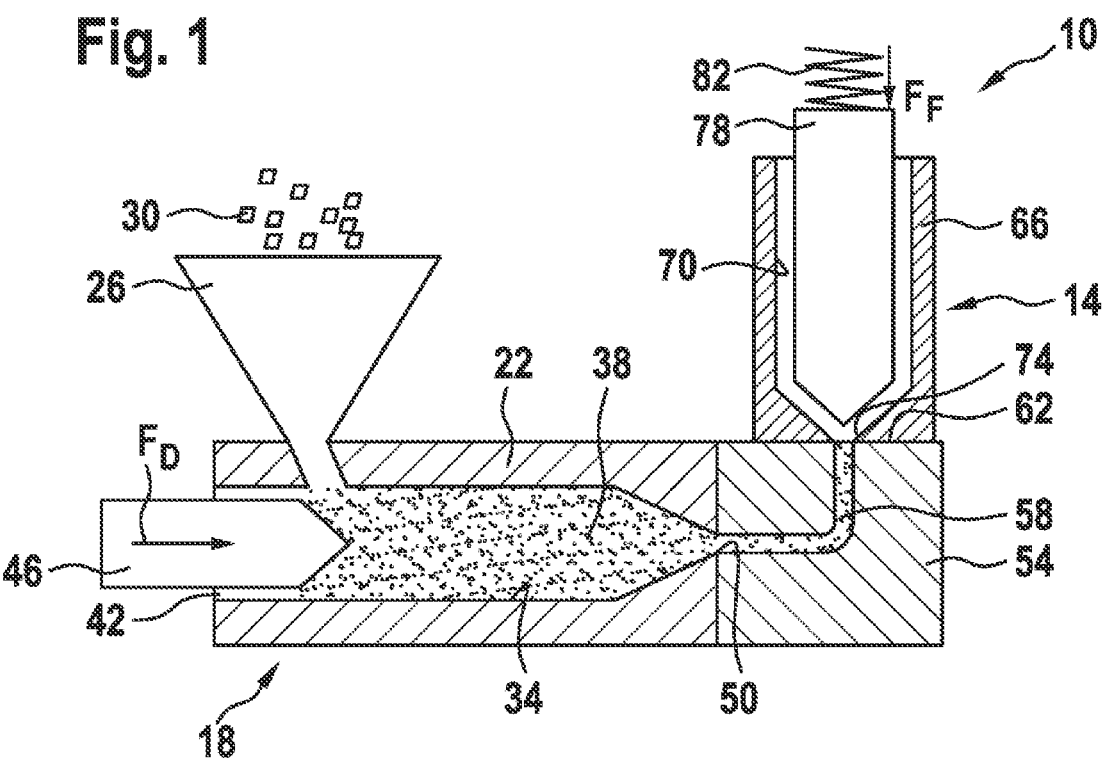

Means are furthermore provided for generating a relative movement between the print head and the working surface on which the object is to be created. Either just the print head, just the working surface, or alternatively both the print head and the working surface can be moved here. In order to influence the discharge of the material on the working surface, an actuator which exerts a force on a metering zone is generally provided in the print head.

WO 2018/086792 A1 discloses a print head for a 3D printer. The print head has a feed line via which a raw material to be printed is fed to the print head. This raw material is melted and plasticized in the print head. This melted material is conveyed inside the print head to an outlet opening via which this material is applied to a printing region.

SUMMARY OF THE INVENTION

Within the scope of the invention, a printing device has been developed for a 3D printer. This printing device comprises a metering unit for melting and plasticizing a material to be printed and a discharge unit for printing the material supplied via the metering unit.

A metering unit is understood within the sense of the invention to be a region to which a raw material is fed, wherein this raw material is melted and plasticized in the metering unit. The melted material can furthermore also be supplied in metered form. The discharge unit is here a region via which the material can be emitted in order to produce a 3D body.

According to the invention, the metering unit and the discharge unit are arranged separately from each other and can be connected to each other, wherein the discharge unit can be transported to the metering unit in order to receive material and a nozzle of the discharge unit and a coupling point of the metering unit come into contact with each other in order to connect the discharge unit to the metering unit.

In the invention, the metering unit and the discharge unit are thus separated from each other. The two units can, however, be connected to each other in order to receive material. Accordingly, the discharge unit has a volume in which a certain quantity of the melted material can be received.

It has been recognized that advantages can consequently be obtained compared with print heads in which the metering unit and the discharge unit are provided together in the print head. In particular, a lower weight, which includes essentially the discharge unit with the melted material, is moved by virtue of the separation of the two units. Accordingly, the dynamics of such a 3D printer are improved.

By virtue of the separation of the different functions, the corresponding unit can be configured more optimally in terms of its function. For example, an actuator which exerts a force on the material in the metering unit no longer has any influence on the discharge quantity in the discharge unit. The, for example, actuators can consequently be designed more cost-effectively and effectively with regard to the result which is to be achieved.

The separation of the metering unit from the discharge unit has the additional advantage that the use of material is improved. In the case of a print head with a metering unit and a discharge unit, the introduced material must be used up in order to prevent subsequent solidification of the melted material in the discharge unit. In many cases, consequently not all the material is used such that wastage occurs. In contrast, it is possible that only the quantity which is required is filled into the discharge unit from the metering unit. As a result, the use of material is thus maximized and costs are reduced so that more profitable manufacturing is possible with such a printing device.

In order to further increase profitability, in a preferred embodiment of the invention, a plurality of discharge units are provided which interact in turn with a single metering unit in order to receive material. This means that only one metering unit is necessary for a plurality of discharge units. A separate metering unit is thus not used for each discharge unit. The capacity of the metering unit is consequently increased such that the profitability of such a system rises.

In a, for example, industrial system, in a further preferred embodiment of the invention, the discharge units are associated with different print chamber units which are separated from one another. It is thus possible for the discharge units of multiple printing processes which each produce a different workpiece to cooperate with just one metering unit.

A separate transport system is preferably provided here to transport the discharge unit to the metering unit. The transport system is here a system which brings the discharge unit from a region where a workpiece is printed to the metering unit. This can be effected, for example, via a rail system along which the discharge unit is transported. In an embodiment, a printing axle can be lengthened in such a way that it extends as far as the metering unit. This is advantageous in particular in the case of smaller systems.

In a further exemplary embodiment, the discharge unit can also be brought to the metering unit via a robot. In the same way, the discharge unit can be transported by the metering unit back to the workpiece. Such a transport system is advantageous in particular in the case of larger systems.

The transport system has the advantage here that the discharge units can be held easily and can be specialized specifically with regard to the discharging function. The costs of the discharge units are reduced as a result. The transport system here advantageously transports a plurality of discharge units so that the capacity of the transport system is improved. The costs of such a transport system can accordingly be reduced.

In an advantageous embodiment, the transport system has a heatable transport support in which the discharge unit is received. The transport support is here part of the transport system via which the discharge unit is held directly. The discharge unit is here surrounded at least partially on the outside by the heatable part of the transport support. It is possible to minimize the cooling of the melted material in the discharge unit during transport by heating the transport support. The storage time of the material in the discharge unit is accordingly lengthened.

The discharge unit is advantageously arranged replaceably in the printing device. In other words, the discharge unit which is being used can be exchanged for a different discharge unit. This has the advantage that a discharge unit with a different nozzle opening, cross-section, or volume can be used for the printing. The color of a discharge unit can also be changed. As a result, the discharge unit can be adapted more optimally to the required manufacture of the workpiece so that the manufacture of the workpiece is improved. Replacing the discharge unit is advantageously possible during operation. Consequently, there is no need to interrupt manufacturing such that the manufacturing can be performed more quickly and more profitably. The discharge unit is here preferably replaced automatically so that staff costs can be reduced.

The discharge unit preferably has a discharge piston which interacts with a means by means of which a force can be applied, counter to a filling direction of the discharge unit, when material is received. An opposing force is thus exerted on the material to be received during the filling of the discharge unit at the metering unit. The discharge piston is here a piston which can move in the discharge unit and which acts on the material received in the discharge unit. In a preferred embodiment, the means is a spring. The force here has the advantage that the means decelerates a backward movement of the discharge piston. Airless filling of the discharge unit can consequently be ensured.

In an expedient embodiment, a discharge piston is provided which is driven by a servomotor such that the material can be dispensed for printing. A servomotor has the advantage that the accuracy and the reproducibility of the dispensing of the material from the discharge unit are increased. The quality of the workpiece is consequently significantly improved.

In contrast to a print head known from the prior art, the servomotor of the discharge unit acts only on homogeneous melted material. As a result, a low output is required for such a servomotor such that such a servomotor can be implemented at a reduced cost.

In order to ensure the high forces in the metering unit, the metering unit preferably has a metering piston for dispensing the material in the metering unit and which is driven via a hydraulic system or an electric motor. The metering piston is here likewise arranged movably in the metering unit and exerts a force on the material in the metering unit in order to convey this material from the metering unit into the discharge unit. In contrast to the discharge unit, where a high degree of accuracy is required, sufficient forces can thus be supplied at the metering unit. By virtue of the discharge unit being separated from the metering unit, each unit can thus be optimized in terms of its function.

The invention additionally provides a method for operating such a printing device. The method here comprises the steps of transporting the discharge unit to the metering unit, connecting the discharge unit to the metering unit, filling the discharge unit with material to be printed, and transporting the discharge unit to a region to be printed. When connecting the metering unit to the discharge unit, both units are connected to each other leaktightly in such a way that the material can be transferred from the metering unit to the discharge unit. The abovementioned advantages can be obtained with such a method.

BRIEF DESCRIPTION OF THE DRAWINGS

Figure 2:
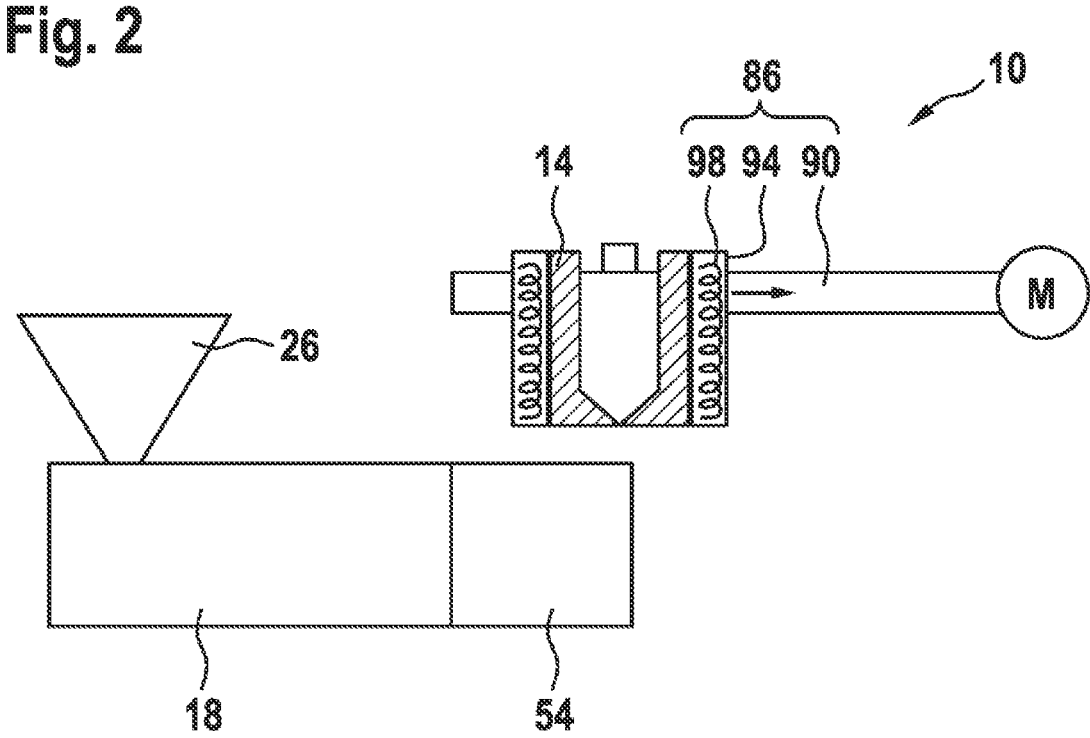

Exemplary embodiments of the invention are illustrated in the drawings and explained in detail in the following description. In the drawings:

FIG. 1 shows an exemplary embodiment of a printing device during filling of a discharge unit, FIG. 2 shows an exemplary embodiment of a printing device during transporting of the discharge unit,

4

Figure 3:
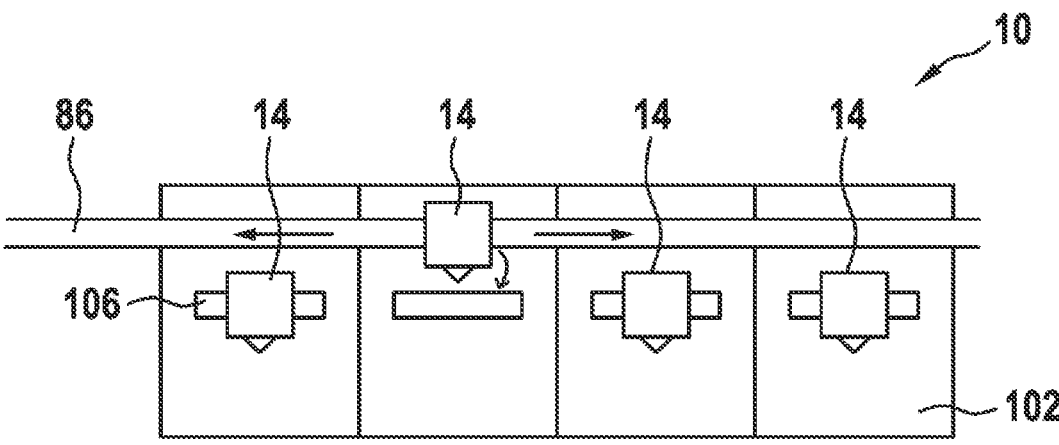
Figure 4:
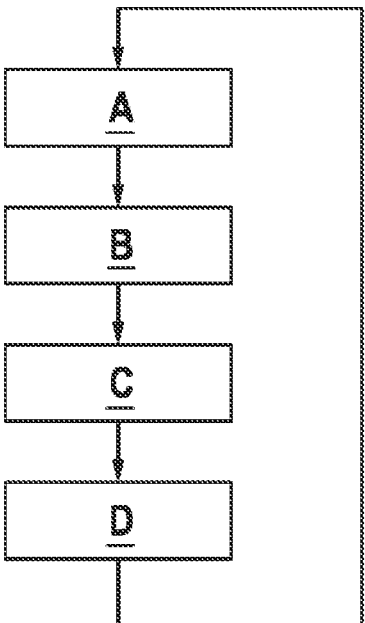

FIG. 3 shows an exemplary embodiment of a printing device with a plurality of discharge units which are arranged in different print chamber units, and FIG. 4 shows a method for operating the printing device.

DETAILED DESCRIPTION

An exemplary embodiment of a printing device 10 during filling of a discharge unit 14 is shown in FIG. 1. FIG. 1 is shown here in a view in section. The printing device 10 has a metering unit 18 in addition to the discharge unit 14. The metering unit 18 is formed here from a base body 22 on which a filler funnel 26 is arranged. Raw material 30 in solid form can be filled into the filler funnel 26. The filler funnel 26 is connected directly to a metering space 34 formed by the base body 22. The raw material 30 for forming a print-ready material 38 is melted and plasticized in this metering space 34.

The metering space 34 has a lateral metering piston opening 42. A metering piston 46, which projects into the metering space 34, is arranged in this metering piston opening 42. A metering piston force FD can be applied via the metering piston 46 to the material 38 in the metering space 34 such that it can be pressed in the direction of a metering delivery opening 50 situated opposite the metering piston opening 42.

The metering unit 18 has at the metering delivery opening 50 a coupling element 54 which forms a duct 58 such that material 38 which is output via the metering delivery opening 50 can be conveyed to a coupling point 62 of the coupling element 54. The discharge unit 14 is arranged at the coupling point 62 such that this discharge unit 14 can receive the melted material 38.

The discharge unit 14 has a discharge body 66 which forms a discharge space 70 in which melted material 38 can be received. A nozzle 74, via which the melted material 38 can be received, is formed at one end, connected to the coupling point 62, of the discharge body 66. The material 38 is likewise applied to a workpiece (not shown) by this nozzle 74.

A discharge piston 78, via which the material 38 can be dispensed, is arranged inside the discharge space 70. A means 82, via which a force $F_F$ can be applied counter to the filling direction during the filling, is arranged above the discharge piston 78. In this exemplary embodiment, the means 82 is configured as a schematically illustrated spring. The airless filling of the discharge unit 14 is ensured by the force $F_F$ exerted on the discharge piston 78. The discharge piston 78 is here displaced in the direction of the spring 82 during the filling.

An exemplary embodiment of the printing device 10 during transport of the discharge unit 14 is shown in FIG. 2. In particular, a transport system 86 of the printing device 10 is shown in this Figure. In this exemplary embodiment, the transport system 86 is formed of an axle unit 90 which is connected here, indicated schematically, to a motor M. The discharge unit 14 can be transported between the metering unit 18 and a workpiece (not shown) to be manufactured via this transport system 86. The transporting can thus be performed automatically.

In this exemplary embodiment, the transport system 86 additionally has a transport support 94 which surrounds the discharge unit 14 on the outside. The transport support 94 here has in particular a heater 98 via which the material in the discharge unit 14 can be heated during the transporting. The storage time of the material in the discharge unit 14 can consequently be lengthened such that, for example, longer transport paths or transporting times are also possible. In an exemplary embodiment not shown here, the transport system 86 can also be implemented via a robot.

FIG. 3 shows an exemplary embodiment of the printing device 10 with a plurality of discharge units 14 which are arranged in different print chamber units 102. Each print chamber unit 102 here manufactures a different workpiece. A discharge unit 14, which in each case is received by a print head body 106 via which the discharge unit 14 can be moved, is arranged in each print chamber unit 102. The print head body 106 can also be designed with a heater (not shown) in the same way as the transport support 94.

The print chamber units 102 are connected to a metering unit 18 in particular via a single transport system 86. Accordingly, a plurality of discharge units 14 can be connected to a single metering unit 18 via a single transport system 86. The capacity of the components is improved as a result.

A method for operating the printing device 10 is shown in FIG. 4. In a first step A, the discharge unit 14 is transported to the metering unit 18. In a second step B, the discharge unit 14 is coupled to the metering unit 18. A leakproof connection between the metering unit 18 and the discharge unit 14 is formed here. In a following step C, the discharge unit 18 is filled by the metering unit 18. The discharge unit 14 can here be filled completely. The discharge unit 14 can likewise be filled only with a specified quantity of material. This quantity is here calculated in such a way that complete use of the material is ensured. In a following step D, the discharge unit 14 filled in this way is transported to a printing region. This method can be repeated multiple times during the printing.

The invention claimed is:

1. A printing device (10) for a 3D printer, the printing device comprising:
 a metering unit (18) configured for melting and plasticizing a material (38) to be printed;
 a discharge unit (14) configured for printing the material (38) supplied via the metering unit (18), the discharge unit (14) having a nozzle opening (74) through which the discharge unit (14) is configured to dispense the material, and
 a transport system (86) including a motor (M) configured to transport the discharge unit (14) to the metering unit (18) and to a workpiece to be manufactured;
 wherein the metering unit (18) and the discharge unit (14) are arranged separately from each other and are configured to be connected to each other,
 wherein the discharge unit (14) is configured to be transported to the metering unit (18) by the transport system in order to receive the material (38), and
 wherein the nozzle opening (74) of the discharge unit (14) and a coupling point (62) of the metering unit (18) are configured to come into contact with each other in order to connect the discharge unit (14) to the metering unit (18) such that the discharge unit (14) is configured to receive the material from the coupling point (62) via the nozzle opening (74).

2. The printing device (10) as claimed in claim 1, wherein the discharge unit (14) is one of a plurality of discharge units (14) interact in turn with a single metering unit (18) in order to receive material (38).

3. The printing device (10) as claimed in claim 2, further comprising a plurality of print chamber units (102), wherein the plurality of discharge units (14) are associated with different ones of the print chamber units (102) which are separated from one another.

4. The printing device (10) as claimed in claim 1, characterized in that the transport system (86) has a heatable transport support (94) in which the discharge unit (14) is received.

5. The printing device (10) as claimed in claim 1, characterized in that the discharge unit (14) is arranged replaceably in the printing device (10).

6. The printing device (10) as claimed in claim 1, characterized in that the discharge unit (14) has a discharge piston (78) which interacts with a means (82) for applying a force ($F_F$), counter to a filling direction of the discharge unit (14), when the material (38) is received.

7. The printing device (10) as claimed in claim 1, characterized in that the discharge unit (14) has a discharge piston (78) which is driven by a servomotor such that the material (38) can be dispensed for printing.

8. The printing device (10) as claimed in claim 1, characterized in that the metering unit (18) has a metering piston (46) for dispensing the material (38) in the metering unit (18), wherein the metering piston is driven via a hydraulic system or an electric motor.

9. The printing device (10) as claimed in claim 1, further comprising a discharge piston (78) positioned within the discharge unit (14), wherein the discharge piston (78) is configured to be displaced from a biased position when the discharge unit (14) receives the material from the coupling point (62) via the nozzle opening (74).

10. The printing device (10) as claimed in claim 9, wherein the discharge piston (78) is biased to close the nozzle opening (74).

11. The printing device (10) as claimed in claim 9, wherein the discharge piston (78) is configured to be displaced from the biased position to dispense the material.

12. A method for operating a printing device (10) as claimed in claim 1, wherein the method comprises the steps:
 transporting (A) the discharge unit (14) to the metering unit (18),
 connecting (B) the discharge unit (14) to the metering unit (18),
 filling (C) the discharge unit (14) with the material (38) to be printed, and
 transporting (D) the discharge unit (14) to a region to be printed.

\* \* \* \* \*